United States Patent
Sprague et al.

(10) Patent No.: US 8,705,686 B2
(45) Date of Patent: Apr. 22, 2014

(54) ADJUSTABLE HARD STOPS FOR NUCLEAR REACTOR RESTRAINER BRACKETS AND METHODS OF USING THE SAME

(75) Inventors: Robin D. Sprague, Wilmington, NC (US); Barry H. Koepke, Castle Rock, CO (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 505 days.

(21) Appl. No.: 12/980,010

(22) Filed: Dec. 28, 2010

(65) Prior Publication Data

US 2012/0163527 A1 Jun. 28, 2012

(51) Int. Cl.
- *G21C 15/25* (2006.01)
- *G21C 19/02* (2006.01)
- *G21C 15/00* (2006.01)
- *G21C 19/00* (2006.01)

(52) U.S. Cl.
USPC ........... 376/372; 376/347; 376/361; 376/366; 376/370; 376/402; 376/407

(58) Field of Classification Search
USPC ......... 376/347, 361, 366, 370, 372, 260, 402, 376/407, 352; 417/65, 151–198; 403/345, 403/365, 367–371, 373–374.5, 376, 377, 403/378, 379.4; 37/446, 452, 455–457
See application file for complete search history.

(56) References Cited

U.S. PATENT DOCUMENTS

| | | | |
|---|---|---|---|
| 4,413,432 A | * | 11/1983 | Bierwith .................... 403/379.4 |
| 4,499,691 A | * | 2/1985 | Karazim et al. ............. 376/260 |
| 4,675,149 A | * | 6/1987 | Perry et al. .................... 376/260 |
| 5,308,032 A | | 5/1994 | Ohta |
| 5,438,774 A | * | 8/1995 | Fletcher et al. ................. 37/456 |
| 5,465,512 A | * | 11/1995 | Livesay et al. .................. 37/457 |
| 5,558,456 A | * | 9/1996 | Nakase et al. ................ 403/365 |
| 5,978,433 A | * | 11/1999 | Erbes et al. .................... 376/372 |
| 6,052,425 A | * | 4/2000 | Erbes et al. .................... 376/372 |

(Continued)

FOREIGN PATENT DOCUMENTS

| EP | 1 022 747 A1 | 7/2000 |
|---|---|---|
| JP | 2003-161795 A | 6/2003 |

OTHER PUBLICATIONS

Office Action issued in connection with SE Application No. 1151236-5, Beslutedatum Aug. 31, 2012.

(Continued)

*Primary Examiner* — Bernarr Gregory
(74) *Attorney, Agent, or Firm* — Harness, Dickey & Pierce, PLC

(57) ABSTRACT

Hard stops are useable in an operating nuclear reactor to separate and bias restrainer brackets and inlet mixers. Hard stops include a lip clamp that clamps to a restrainer bracket and a wedge member that biases against the inlet mixer. The wedge member and lip clamp are engaged such that the two components can slide against one another to bias the restrainer bracket and inlet mixer. The lip clamp includes a clamp arm and an engagement member to clamp opposite sides of the restrainer bracket. Ratchet assemblies maintain selective positioning various components of the hard stops. Hard stops may be used in several different numbers, positions, and configurations in repair or modification systems. Hard stops may be installed by determining location on an outside of a restrainer bracket for the hard stop, securing the hard stop at the location, and biasing the hard stop between two components at the location.

20 Claims, 7 Drawing Sheets

(56) References Cited

U.S. PATENT DOCUMENTS

| | | | |
|---|---|---|---|
| 6,320,923 B2 * | 11/2001 | Wivagg et al. | 376/407 |
| 6,394,765 B1 | 5/2002 | Erbes et al. | |
| 6,435,839 B1 | 8/2002 | Erbes | |
| 6,463,114 B1 | 10/2002 | Wivagg | |
| 6,490,331 B2 * | 12/2002 | Erbes | 376/372 |
| 6,788,756 B2 * | 9/2004 | Erbes | 376/372 |
| 6,857,814 B2 * | 2/2005 | Jensen | 403/374.3 |
| 7,272,204 B2 * | 9/2007 | Jensen | 376/260 |
| 7,596,200 B2 * | 9/2009 | Jensen | 376/372 |
| 7,627,074 B2 * | 12/2009 | Erbes et al. | 376/372 |
| 8,077,823 B2 * | 12/2011 | Baversten et al. | 376/352 |
| 8,170,174 B1 * | 5/2012 | Lentner et al. | 376/372 |
| 2001/0001009 A1 | 5/2001 | Wivagg et al. | |
| 2007/0189434 A1 | 8/2007 | Jensen | |
| 2011/0280360 A1 | 11/2011 | Flanigan et al. | |

OTHER PUBLICATIONS

Notification from the Spanish Patent Office dated Nov. 11, 2013 for Spanish Application No. 201132115, No Translation.
Feb. 24, 2012 Office Action issued in related U.S. Appl. No. 13/106,420.

* cited by examiner

ADJUSTABLE HARD STOPS FOR NUCLEAR REACTOR RESTRAINER BRACKETS AND METHODS OF USING THE SAME

BACKGROUND

Conventional boiling water reactors include a reactor pressure vessel (RPV) which surrounds a core shroud. The core shroud, in turn, surrounds a reactor core. Generally, each of the core shroud and the reactor pressure vessel are cylindrically shaped such that an outer diameter of the core shroud is less than an inner diameter of the reactor pressure vessel. Between a reactor pressure vessel wall and a core shroud wall is an annular space in which jet pump assemblies are typically located.

FIG. 1 illustrates a conventional jet pump assembly 25 located in the aforementioned annulus. As illustrated in FIG. 1, an inlet nozzle 10 extending through a sidewall 15 of RPV 20 is coupled to jet jump assembly 25. Jet pump assembly 25 includes a riser pipe 30 that extends between shroud 35 and sidewall 15 of RPV 20. Riser pipe 30 is coupled to two jet pumps 35A and 35B by a transition assembly 40. Each jet pump 35A and 35B includes a jet pump nozzle 42, a suction inlet 45, an inlet mixer 50, and a diffuser 55. For example, first jet pump 35A includes a first inlet mixer 50A and second jet pump 35B includes second inlet mixer 50B. Jet pump nozzles 42 are positioned in the suction inlets 45 that are located at a first end of inlet mixers 50A and 50B. Diffusers 55 are coupled to a second end of inlet mixers 50A and 50B by a slip joint 65. Typically, both inlet mixers 50A and 50B and diffusers 55 are formed of multiple cylindrical sections. Circumferential welds 70 join the cylindrical sections together. A support member (riser brace) 75 typically surrounds riser pipe 30 and connects to riser pipe 30 via a weld 80 which may span approximately 180 degrees around the circumference of the riser pipe 30. Inlet mixers 50A and 50B are secured to riser pipe 30 via a restrainer bracket 105.

As shown in FIG. 2, conventional restrainer bracket 105 is a yoke-like member surrounding the inlet mixer 50A at a belly band 195 of inlet mixer 50A. Though not shown, a similar yoke-like restrainer bracket surrounds mixer 50B. Penetrating the restrainer bracket 105 are at least two set screws 110 which press against the inlet mixer belly band 195. In FIG. 2, only one set screw 110 is shown. Inlet mixer 50A further includes several guide ears 190 arranged about, and extending from, outer edges of restrainer bracket 105. A strengthening rib 191 may also be present between an edge and lip of restrainer bracket 105 to provide rigid support to the restrainer bracket 105. A main wedge 115 is typically provided between a restrainer bracket pad 145 of restrainer bracket 105 and inlet mixer belly band 195. The main wedge 115 includes a circular hole through which a wedge rod 130 passes. The wedge rod 130 has a threaded top end 131 which connects to an upper support casting 120 arranged above restrainer bracket 105 and a threaded bottom end which connects to a lower support casting 125 below restrainer bracket 105. As inlet mixer 50A moves vertically or horizontally, wedge 115 may slide on wedge rod 130 and, through contact between restrainer bracket pad 145, wedge 115, and restrainer bracket belly band 195, such motion of the inlet mixer 50A may be nondestructively opposed and reduced.

SUMMARY

Example embodiments include hard stops useable in an operating nuclear reactor to separate and bias related components, such as restrainer brackets and inlet mixers. Example embodiment hard stops may include a lip clamp that clamps to a restrainer bracket in a jet pump assembly and a wedge member that biases against an inlet mixer at the restrainer bracket. The wedge member and the lip clamp may be moveably engaged such that the two components can slide against one another in a single direction. The lip clamp may include a clamp arm and an engagement member that clamp on opposite sides of the restrainer bracket. The lip clamp may further include a ratchet assembly that engages and maintains selective positioning of the clamp arm relative to the engagement member through ratcheting action.

The lip clamp further may be moveably engaged to the wedge member in a single direction via an engagement extension captured by a slot in the wedge member. Relative motion along this interface may be achieved via a rod that rotatably seats in a flange defined by the wedge member while mating with the engagement extension, through a threaded surface and threaded hole. A further ratchet assembly may be attached to the rod with a corresponding ratchet keep on the wedge member to maintain selective positioning of the lip clamp relative to the wedge member in the single interface direction. By configuring the single interface direction as an incline with respect to a straight line distance between the inlet mixer and the restrainer bracket spanned by the hard stop, the inlet mixer and restrainer bracket may be forced apart by moving the lip clamp in the single direction with respect to the wedge member. Example embodiment hard stops may be fabricated from reactor-compatible materials, including stainless steel, a nickel alloy, and a zirconium alloy.

Example embodiment hard stops may be used in several different numbers, positions, and configurations. For example, two example embodiment hard stops may be affixed to a restrainer bracket at guide ears or strengthening ribs of the restrainer bracket. Example methods of using hard stops in nuclear reactors may include determining locations for installing the hard stop to bias inlet mixers in a direction that prevents the inlet mixer from flexing outward from the jet pump assembly, securing at least one hard stop at the determined location, and/or biasing the hard stop between the first component and the second component at the determined location. For example, the location may be at a restrainer bracket of a jet pump assembly in the nuclear reactor, between the restrainer bracket and an inlet mixer surrounded by the restrainer bracket.

BRIEF DESCRIPTION OF THE DRAWINGS

Example embodiments of the present invention will be more clearly understood from the following detailed description taken in conjunction with the accompanying drawings.

DETAILED DESCRIPTION

Figure 1:
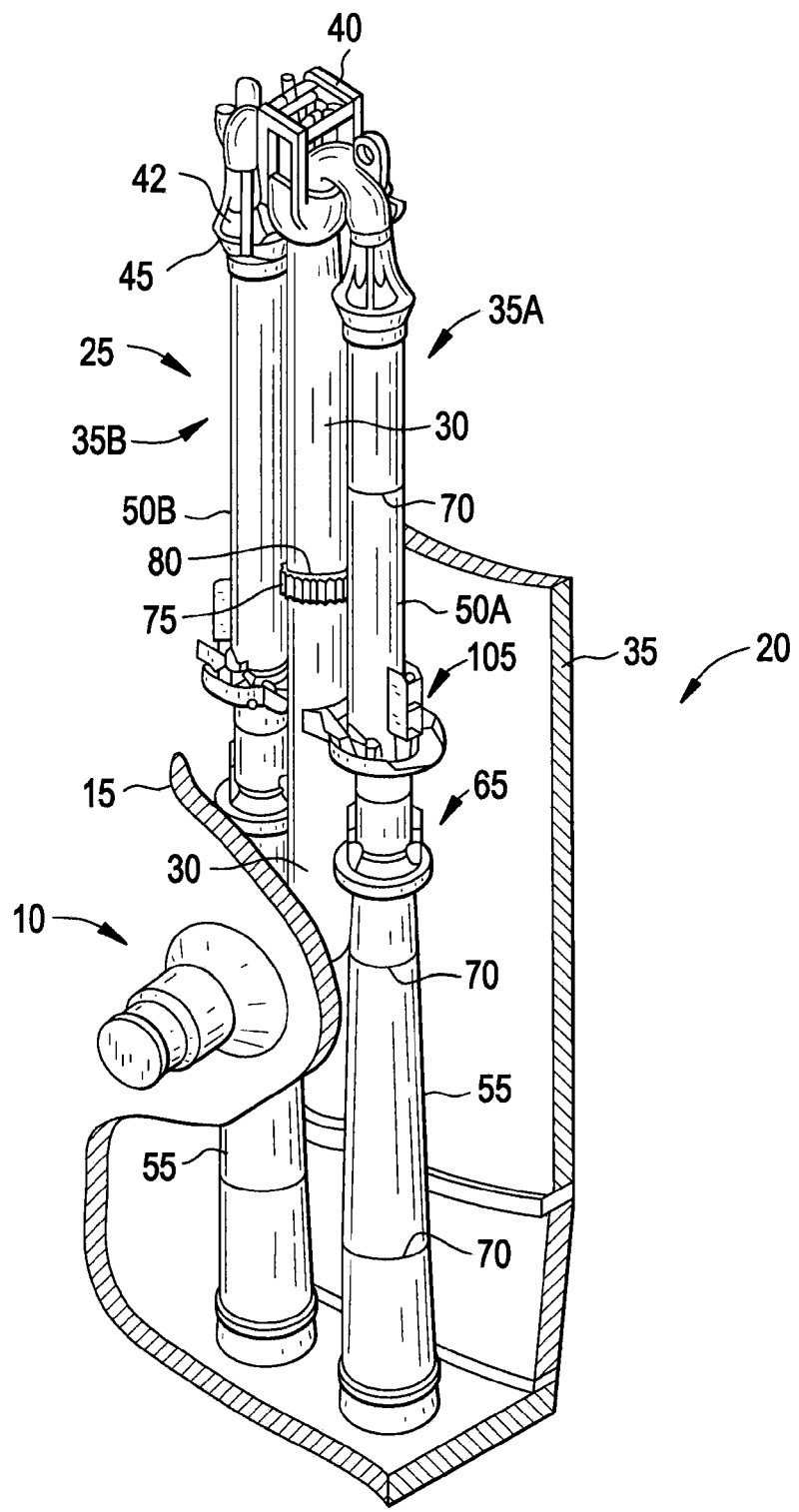
FIG. 1 is a view of a conventional jet pump assembly.

Example embodiments of the invention will now be described more fully with reference to the accompanying drawings, in which example embodiments are shown. The invention may, however, be embodied in different forms and should not be construed as limited to the embodiments set forth herein. For example, although example embodiments may be described with reference to a Boiling Water Reactor (BWR), it is understood that example embodiments may be useable in other types of nuclear plants. Example embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

As discussed above, a conventional riser pipe 30 of a jet pump assembly 25 is connected to inlet mixers 50A and 50B via restrainer brackets 105. Inventors of the present application have recognized that vertical and radial movement in inlet mixers 50A and 50B causes wear and other operational deficiencies in wedge 115 and other various elements interacting with restrainer brackets 105, such that restrainer brackets 105 lose capacity to stabilize inlet mixers 50A and 50B in both horizontal/radial and vertical directions. In this way, although vertical movement of inlet mixer 50A and 50B may be permitted for thermal expansion, vibration, etc., by conventional restrainer brackets, this vertical movement may cause inlet mixer 50A and/or 50B to further displace horizontally away from set screws 110, flexing away from riser pipe 30, causing additional vibration, damage, and/or reduced flow efficiency through jet pumps 50A and/or 50B.

Example embodiments and methods discussed below uniquely address these effects of conventional restrainer bracket 105 usage to achieve several advantages, including reduced horizontal flexing of inlet mixers without significant alteration of existing restrainer bracket structures, and/or other advantages discussed below or not, in nuclear power plants.

Example Embodiments

Figure 3:
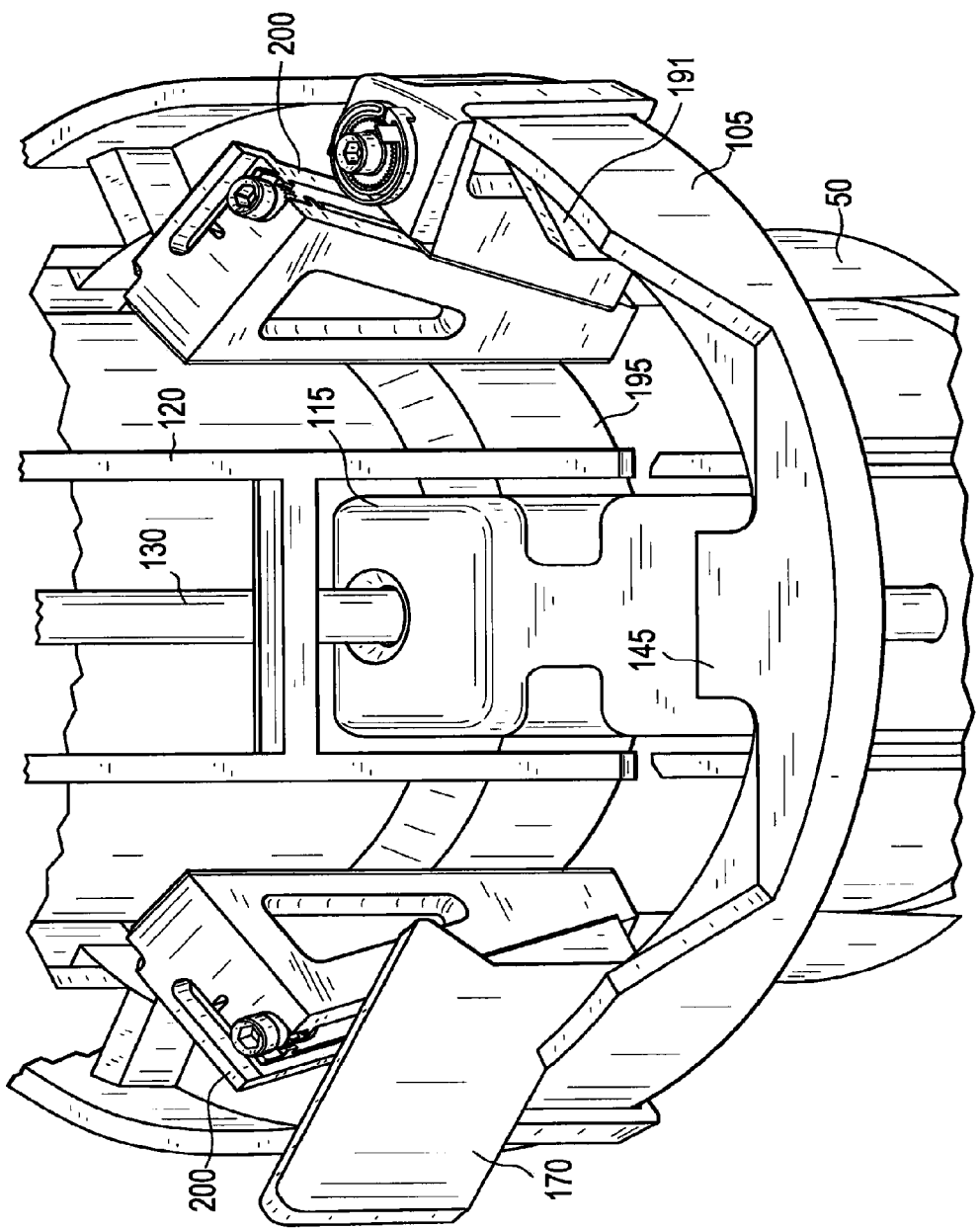
FIG. 3 is an illustration of an example embodiment system using example embodiment hard stops.

FIG. 3 is an illustration example embodiment system using example embodiment hard stops 200 to prevent or reduce horizontal/radial flexing of an inlet mixer 50 toward restrainer bracket 105 and away from central riser pipe 30 because of, or in combination with, upward or downward vertical movement of inlet mixer 50 along a length of inlet mixer 50. As shown in FIG. 3, one or more example embodiment hard stops 200 may be seated between restrainer bracket 105 and inlet mixer 50 to stabilize movement between restrainer bracket 105 and inlet mixer 50 and prevent or reduce additional movement of inlet mixer 50 outward toward restrainer bracket 105. For example, two example embodiment hard stops may be placed between restrainer bracket 105 and inlet mixer 50 at guide ear 190 and strengthening rib 191 of restrainer bracket 105. In this way, if a biasing structure or force is provided on an opposite side of inlet mixer 50 (from the direction of riser pipe 30 of FIG. 1), equal, three-point support may be provided by example embodiment hard stops 200 equidistant on either side of a midpoint of restrainer bracket 105 from the opposite biasing force.

By seating against guide ears 190 and/or strengthening rib 191, circumferential movement of example embodiment hard stops 200 about restrainer bracket 105 may be reduced or prevented, preserving balanced contact between inlet mixer 50 and hard stops 200. Additionally, by directing force from inlet mixer 50 against one or more example embodiment hard stop 200, direct force, and resulting wear, on set screws 110, wedge 115, and related structures may be reduced or prevented. Although example embodiment hard stops 200 are shown in pairs, each against guide ear 190 or strengthening rib 191, in FIG. 3, it is understood that other numbers and positions of example embodiment hard stop 200 are equally useable.

Example embodiment hard stop 200 is shaped to seat against inlet mixer 50 and guide ear 190/strengthening rib 191, and example embodiment hard stop 200 is further shaped to join to restrainer bracket 50. For example, example embodiment hard stop 200 may extend around and clamp a lip of restrainer bracket 105 to rigidly join to restrainer bracket 105 in vertical and horizontal/circumferential directions. Example embodiment hard stop 200 may further abut guide ear 190 and/or inlet mixer 50 at belly band 195, for example, and bias against these structures. Several different fastening mechanisms and arrangements are useable for example embodiment hard stops to provide normal, adjustable biasing at desired directions while maintaining desired separation between restrainer bracket 105 and inlet mixer 50 to avoid the above discussed outward flexing and wear. For example, hard stops may be attached by mechanical fasteners including bolts and screw, or welded, to restrainer brackets 105. Similarly, although example embodiments are discussed as joining to restrainer brackets and biasing against inlet mixers, it is understood that example embodiment hard stops may be placed in other structures to achieve desired separation and/or biasing.

Figure 4:
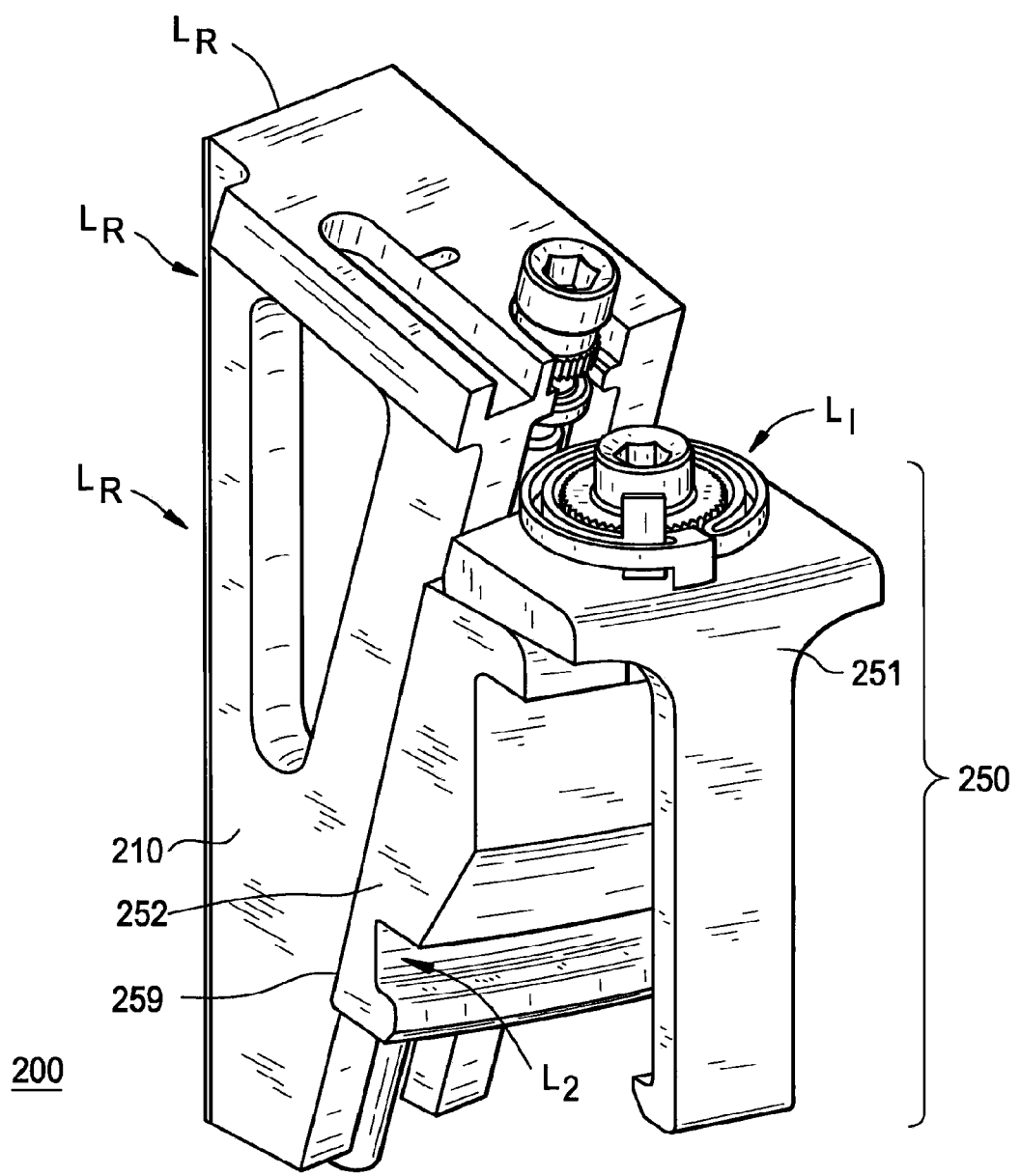
FIG. 4 is an illustration of an example embodiment hard stop.

FIG. 4 is an isometric view of an example embodiment hard stop 200 as subjected to forces if used in the example system of FIG. 3. As shown in FIG. 4, example embodiment hard stop 200 may contact, and receive a normal force $L_2$ from, restrainer bracket 105 in a radial direction. Example embodiment hard stop 200 may further contact, and receive a normal force $L_1$ from, a guide ear 190 or strengthening rib 191 in a circumferential direction. The sum of forces of $L_1$ and $L_2$ may provide a resultant normal force $L_R$ to inlet mixer 50 in a direction normal to a surface of inlet mixer 50 at any vertical position of contact between inlet mixer 50 and example embodiment hard stop 200. As shown in FIG. 4, resultant force $L_R$ may be evenly distributed to inlet mixer 50 from example embodiment hard stop 200. Of course, other forces from other components interacting with example embodiment hard stop 200 may provide a desired resultant force.

Specific features of example embodiment hard stop 200 are described below that uniquely enable the above-described positioning and configuration. It is understood that other structures and functionality from those described below may be used in example embodiment hard stops to provide desired connections and force distributions between restrainer bracket and inlet mixers, or any other structure. As shown in FIG. 4, example embodiment hard stop 200 may include an adjustable lip clamp 250 for fastening to restrainer bracket 105, so as to rigidly join hard stop 200 and restrainer bracket 105 in vertical, horizontal/circumferential, and horizontal/radial directions, in example embodiments. Example embodiment hard stop 200 may further include a wedge member 210 that moveably joins to lip clamp 250 and is configured to abut, at any vertical point, restrainer bracket 50 at belly band 195 or elsewhere. Lip clamp 250 and wedge member 210 may movably engage at a diagonal or inclined interface 259.

Figure 5:
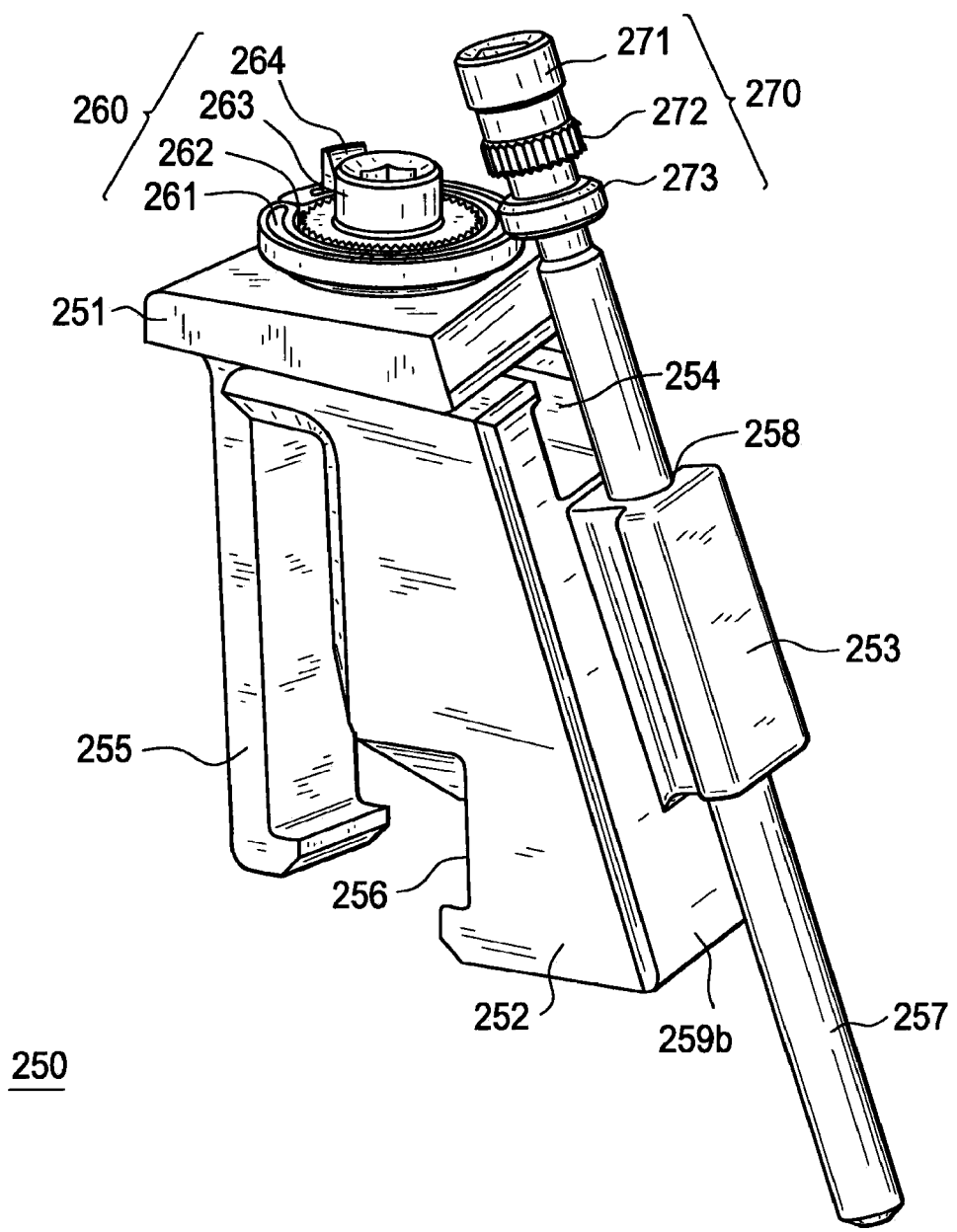
FIG. 5 is a detail view of a lip clamp useable in example embodiment hard stops.

Lip clamp 250 is described in connection with FIGS. 4 and 5. Lip clamp 250 may provide rigid fixing between restrainer bracket 105 and example embodiment hard stop 200 discussed above. As shown in FIGS. 4 and 5, lip clamp 250 may include two moveably engaged components, clamp arm 251 and lip engagement member 252. Clamp arm 251 may include a brace 255 that extends downward in a vertical direction a length sufficient to reach a bottom surface of a restrainer bracket 105 (FIG. 3). Brace 255 may include a ledge that extends around a bottom surface of a restrainer bracket 105. Brace 255 may be shaped and sized to directly mate with a restrainer bracket 105, and/or brace 255 may be alternately configured to indirectly engage with restrainer brackets or other features to provide a desired positioning/functionality for example embodiment hard stop 200.

Clamp arm 251 may be movable in lip engagement member 252 so as to provide a desired clamping functionality and/or physical configuration, for removal and installation, for example. As shown in FIGS. 4 and 5, clamp arm 251 may move by sliding in a horizontal/radial direction, in a direction toward wedge member 210. Clamp arm 251 may slide in a clamp slot 254 that captures an extension of clamp arm 251 to prevent relative movement between clamp arm 251 and lip engagement member 252 in other directions. Lip engagement member 252 may include a lip-receiving surface 256 into which a lip or extension of restrainer bracket 105 (FIG. 3) may seat as clamp arm 251 with brace 255 is biased against an opposite surface of restrainer bracket 105 (FIG. 3). In this way, brace 255 and lip-receiving surface 256 may correspond to opposite surfaces of restrainer bracket 105 and clamp restrainer bracket 105 between clamp arm 251 and lip engagement member 252.

Clamp arm 251 may further include a ratchet assembly 260 or other device to provide for selective movement and tensioning between clamp arm 251 and lip engagement member 252. As shown in FIG. 5, ratchet assembly 260 may include several ratchet components including an adjustable ratchet bolt 263, a ratchet surface 262 and corresponding ratchet keeper 261, and/or a release 264. Ratchet bolt 263 may extend through clamp arm 251 and interface with a surface of clamp slot 254 to move or lock clamp arm 251 in clamp slot 254 when rotated. A ratchet surface 262 may turn with ratchet bolt 263 and ratchet against a fixed corresponding ratchet keeper 261, providing for single-way movement of ratchet bolt 263 and thus clamp arm 251. For example, ratchet assembly 260 may permit single-way movement of bolt 263 in a way that drives clamp arm 251 toward lip engagement member 252 so as to provide a biasing clamp of restrainer bracket 105 (FIG. 3) between clamp arm 251 and lip engagement member 252. A spring-loaded release 264 may permit two-way movement of ratchet bolt 262, permitting loosening or releasing of example embodiment hard stop 200 from a restrainer bracket 105, for example. Of course, other mechanisms and structures may provide selective biasing between clamp arm 251 and lip engagement member 252, including springs, elastic members, screws and threaded holes, magnets, adhesives, etc., any of which permit lip clamp 250 to securely join to an existing restrainer bracket.

As shown in FIG. 4, lip clamp 250 and wedge member 210 may slidably engage about inclined interface 259, so as to permit relative movement between lip clamp 250 and wedge member 210 along inclined interface 259 between surfaces 259a and 259b of wedge member 210 and lip clamp 250, respectively. Such engagement may be achieved in several ways, including capturing mating extension 253 (FIG. 5) of lip clamp 250 within a corresponding mating slot 213 (FIG. 6) of wedge member 210. Surfaces 259a and 259b and contact between mating extension 253 and corresponding mating slot 213 may otherwise be smooth to permit the two surfaces to slidably move along each other. Relative movement of lip clamp 250 and wedge member 210 in any other direction may be prohibited.

Specific relative positions of wedge member 210 and lip clamp 250 may be achieved and maintained in several ways. For example, as shown in FIG. 5, mating extension 253 may further include a threaded hole 258 passing through mating extension 253 in a direction of inclined interface 259. Threaded rod 257 may include corresponding threads and be screwed into threaded hole 258. Relative position between threaded rod 257 and mating extension 253, and thus lip clamp 250, may be adjusted by turning threaded rod 257 in threaded hole 258.

Figure 6:
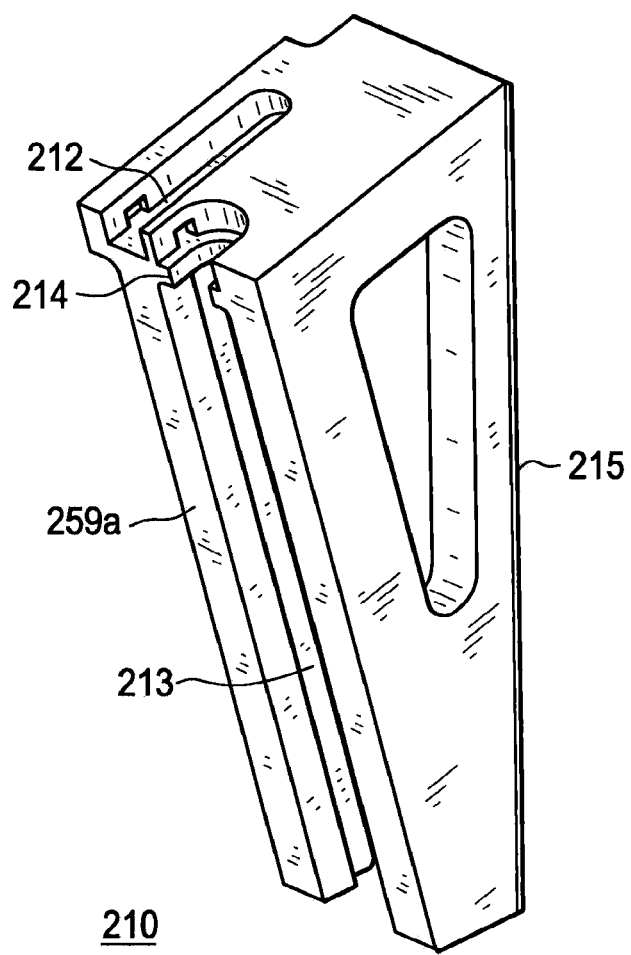
FIG. 6 is a detail view of a wedge member useable in example embodiment hard stops.

An interface ratchet assembly 270 may be provided on threaded rod 257 to maintain relative position between lip clamp 250 and wedge member 210, permit one-way rotation of threaded rod 257 and thus one-way relative movement of wedge member 210 and lip clamp 250, and/or permit biasing of example embodiment hard stop 200 by maintaining relative position. As shown in FIGS. 5 and 6, threaded rod 257 may include a bushing 273 shaped to engage and be rotatably captured in a corresponding flange 214 in wedge member 210. As threaded rod 257 is turned relative to threaded hole 258, lip clamp 250 may be forced in a direction along interface 259 due to threaded rod 257 being fixed to wedge member 210 through bushing 273 seating in corresponding flange 214. Rod bolt 271 and ratchet surface 272 may function as a ratchet with wedge ratchet keeper 212, in a similar manner to ratchet assembly 260. For example, ratchet surface 272 may interface with wedge ratchet keeper 212 to permit rod bolt 271 and threaded rod 257 to be turned in only a single direction, pushing lip clamp 205 downward along interface 259. A release mechanism may release or permit two-way movement in interface ratchet assembly 270.

Of course, other structures and functionality for providing desired relative movement, positioning, and biasing between lip clamp 250 and wedge member 210 about interface 259 are equally useable in example embodiment hard stops 200. For example, threaded rod 257 may not be threaded but smooth and integral with mating extension 253. Threaded rod 257 may itself telescopically elongate when rod bolt 271 is rotated to move lip clamp 250 and wedge member 210 relative to one another. Alternatively, geared arrangements, pins and stop holes, springs, elastic members, screws and threaded holes, magnets, adhesives, etc. or any other fixable moving configuration between lip clamp 205 and wedge member 210 may enable selective relative movement and expansion of example embodiment hard stop 200.

As shown in FIG. 6, wedge member 210 may include a contact surface 215 that contacts inlet mixer 50, such as at belly band 195, in a substantially flush manner. Wedge member 210 and contact surface 215 have a relatively long vertical length so at to contact an inlet mixer 50 even if inlet mixer 50 has shifted up or down vertically or radially during operation. Wedge member 210 and/or lip clamp 250 in example embodiment hard stop 200 may further have a horizontal width and lateral surface configured to bear against an external lateral structure, such as guide ear 195 or strengthening rib 191. By acting as a rigid body after being selectively biased in the above-discussed manners, example embodiment hard stop 200 may translate forces $L_1$, $L_2$, and $L_R$ among desired components such as inlet mixer 50 and restrainer bracket 105. As shown in FIGS. 4-6, example embodiment hard stop may extend in a radial direction and/or provide additional biasing force in the $L_2$ direction, when wedge member 210 is driven downward along interface 259 relative to lip clamp 250. For example, by rotating rod bolt 271 when lip clamp is secured to a restrainer bracket 105, wedge member 210 may move downward along inclined interface 259, such that contact surface 215 moves both vertically downward and horizontally/radially inward. That is, a total distance between contact surface 215 and lip receiving surface 256 seated against a restrainer bracket 205 may be increased when wedge member 210 is drawn downward in example embodiment hard stop 200. This increased distance may provide additional biasing against inlet mixer 50 and/or achieve a desired degree of separation between restrainer bracket 105 and inlet mixer 50. Ratcheting action of interface ratchet assembly 270 may fix example embodiment hard stop 200 in the biased configuration to provide constant separation and force through example embodiment hard stop 200.

Example embodiment hard stops may be fabricated from materials designed to withstand operating conditions within a nuclear reactor and provide material compatibility and avoid fouling for contacting pieces. For example, wedge member 210, clamp arm 251, lip engagement member 252, ratchet bolt 263, and/or threaded rod 275 may be fabricated of stainless steel, such as type-304 stainless steel. Various ratchet keepers 261 and 212 may be fabricated of a nickel-chromium alloy, such as Inconell type X-750, to preserve material compatibility with other hard stop element that are in constant material contact with keepers 261 and 212. Or, for example, any of threaded rod 275 and ratchet bolt 263 may be fabricated from other types of stainless steels, such as types-304, -316 or XM-19. Still further, any parts of example embodiment hard stops may be fabricated from zircalloys, austenitic stainless steels, nickel alloys, etc. that substantially maintain their physical properties in high pressure/temperature aqueous environments with elevated levels and types of radioactivity, depending on the desired material characteristics and material compatibility among reactor elements interacting with example embodiment hard stops.

Example embodiment hard stops 200 are thus useable in several harsh environments such as operating nuclear power reactors. It is understood that several features discussed above in connection with example embodiments may be reconfigured or omitted based on the specific application and/or desired operational characteristics of example embodiment hard stops. While example embodiment hard stops 200 may be installed and used in accordance with example methods discussed below, it is understood that other uses and installation locations may be applicable with example embodiment hard stops.

Example Methods

Figure 2:
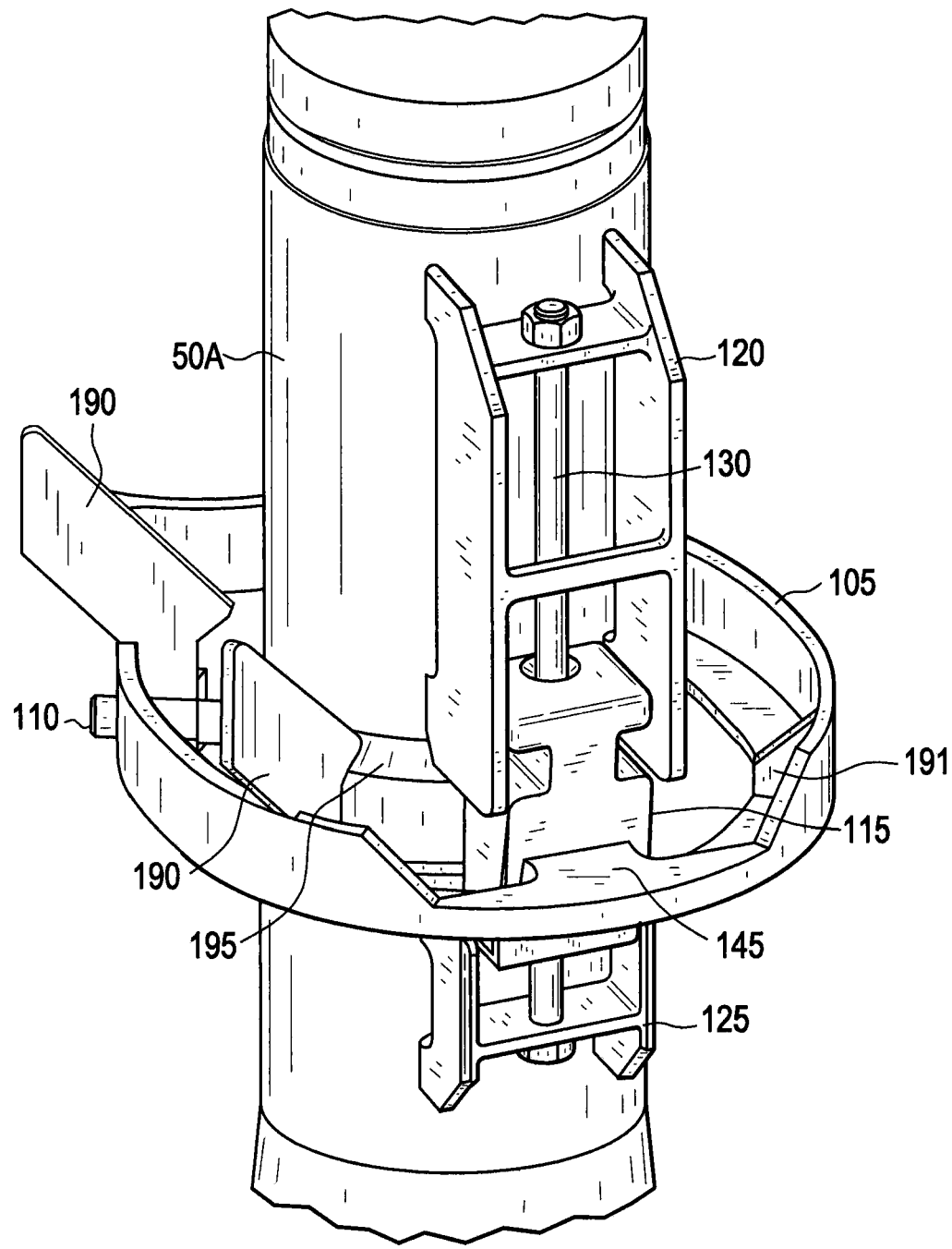
FIG. 2 is a view of a conventional restrainer bracket of a jet pump assembly.
Figure 7:
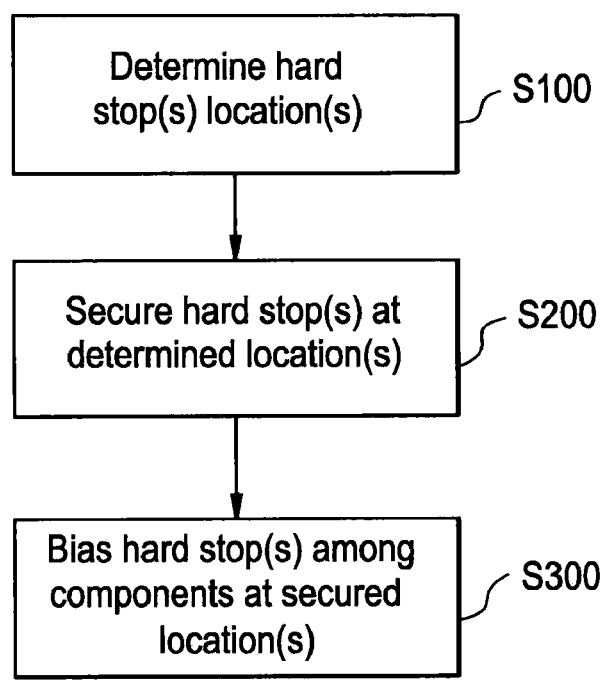
FIG. 7 is a flow chart illustrating an example method of using hard stops in a nuclear reactor.

Example methods include installing one or more hard stops, such as example embodiment hard stop 200, in a jet pump of a nuclear reactor. As shown in FIG. 7, example methods include determining S100 a location or locations for installation of hard stop(s) within a nuclear power plant. For example, in S100, specific radial positions about a restrainer bracket 105 (FIG. 2) may be chosen for installing hard stops to achieve a desired separation and/or biasing between restrainer bracket 105 and inlet mixer 50, such as between restrainer bracket 105 and inlet mixer 50 on a side of inlet mixer 50 farthest from riser pipe 30.

Example methods further include securing S200 hard stops in the determined location or locations. For example, using example embodiment hard stop 200, lip clamp 250 may be loosened through ratchet assembly 260 such that clamp arm 251 and lip engagement member 252 fit around a restrainer bracket 105. Ratchet assembly 260 may then be selectively tightened such that surfaces 256 and 255 seat against opposite corresponding surfaces of restrainer bracket 105, fixing example embodiment hard stop 200 to the restrainer bracket 105 at the desired location. Securing S200 may be performed at any point when the selected location is available, including during plant fabrication or during a maintenance outage such as a refueling outage.

Example methods further include S300 biasing the secured hard stop(s) to achieve a desired level of pressure or separation between two components at the selected location. For example, using example embodiment hard stop 200, threaded rod 257 may be ratcheted through interface ratchet assembly 270 so as to move lip clamp 250 and wedge member 210 into a desired relative position having a desired radial separation and/or providing a desired level of bias between structures seating against example embodiment hard stop 200. Biasing in S300 may further include moving an external structure, such as inlet mixer 50 against set hard stops 200, such as with a structure positioned between inlet mixer 50 and riser pipe 30 urging inlet mixer outward toward hard stops 200 set at opposite positions on restrainer bracket 105. Biasing S300 may be performed at any point, including during plant fabrication or during a maintenance outage such as a refueling outage, or during operation through remote-controlled mechanisms, for example.

The foregoing description is illustrative of example embodiments and is not to be construed as limiting thereof. Those skilled in the art will readily appreciate that many modifications are possible in the example embodiments without materially departing from the novel teachings and advantages of the present inventive concept. Accordingly, all such modifications are intended to be included within the scope of present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A hard stop useable in an operating nuclear reactor, the hard stop comprising:
 a clamp configured to clamp to a restrainer bracket in a jet pump assembly; and
 a wedge member configured to bias against an inlet mixer at the restrainer bracket, the wedge member being moveably engaged with the clamp.

2. The hard stop of claim 1, wherein the clamp includes a clamp arm and an engagement member configured to engage opposite sides of the restrainer bracket, and wherein the clamp arm and the engagement member are moveably engaged such that the restrainer bracket can be clamped between the clamp arm and the clamp.

3. The hard stop of claim 2, wherein the clamp further includes a ratchet assembly connected to the clamp arm and the engagement member, and wherein the ratchet assembly is configured to maintain selective positioning of the clamp arm relative to the engagement member.

4. The hard stop of claim 1, wherein the clamp further includes an engagement extension, and wherein the wedge member defines an engagement slot configured to capture the engagement extension and permit movement of the engagement extension and clamp in a single direction.

5. The hard stop of claim 4, further comprising:
 a rod configured to rotatably seat in a flange defined by the wedge member, the rod configured to mate with the engagement extension.

6. The hard stop of claim 5, wherein the rod includes a threaded surface, and wherein the engagement extension defines a corresponding threaded hole configured to receive the rod such that the engagement extension and clamp are moved in the single direction relative to the wedge member by rotation of the rod.

7. The hard stop of claim 6, wherein the rod further includes a ratchet assembly, and wherein the wedge member includes a corresponding ratchet keeper, and wherein the ratchet assembly is configured to maintain selective positioning of the clamp relative to the wedge member in the single direction.

8. The hard stop of claim 4, wherein the single direction is inclined with respect to a shortest line between the inlet mixer and the restrainer bracket such that a distance between the inlet mixer and the restrainer bracket spanned by the hard stop changes with movement of the engagement extension and clamp in the single direction.

9. The hard stop of claim 1, wherein at least one of the clamp and the wedge member are further configured to seat against at least one of a guide ear and strengthening rib of the restrainer bracket.

10. The hard stop of claim 1, wherein the hard stop consists of at least one of stainless steel, a nickel alloy, and a zirconium alloy.

11. A system for modifying for a jet pump assembly, the system comprising:
 an inlet mixer to a side of a riser pipe;
 a restrainer bracket surrounding the inlet mixer; and
 at least one hard stop fixed to the restrainer bracket between the inlet mixer and the restrainer bracket, the hard stop biasing the inlet mixer toward the riser pipe.

12. The system of claim 11, wherein the at least one hard stop includes a first hard stop and a second hard stop, and wherein the first hard stop and the second hard stop are arranged at one of a guide ear and a strengthening rib of the restrainer bracket.

13. The system of claim 11, wherein no open space is present between the inlet mixer and the restrainer bracket at the hard stop.

14. The system of claim 11, wherein the hard stop includes,
 a clamp clamped to the restrainer bracket, and
 a wedge member biased against the inlet mixer, and wherein the wedge member is moveably engaged with the clamp.

15. The system of claim 14, wherein the clamp includes a clamp arm and an engagement member engaging opposite sides of the restrainer bracket, and wherein the clamp arm and the engagement member are moveably engaged such that the restrainer bracket is clamped between the clamp arm and the engagement member.

16. The system of claim 14, wherein the clamp further includes an engagement extension, and wherein the wedge member defines an engagement slot configured to capture the engagement extension and permit movement of the engagement extension and clamp in a single direction.

17. The system of claim 16, wherein the single direction is inclined with respect to a shortest line between the inlet mixer and the restrainer bracket such that a distance between the inlet mixer and the restrainer bracket spanned by the hard stop changes with movement of the engagement extension and clamp in the single direction.

18. The system of claim 11, wherein the hard stop consists of at least one of stainless steel, a nickel alloy, and a zirconium alloy.

19. A method for stabilizing components in a nuclear reactor environment, the method comprising:
 determining at least one location in a nuclear reactor for installing a hard stop such that the hard stop biases against an inlet mixer in a direction of a riser pipe;
 securing at least one hard stop at the determined location, the hard stop including a clamp configured to clamp to a first component at the determined location, the hard stop including a wedge member configured to bias against the inlet mixer, the wedge member being moveably engaged with the clamp;
 biasing the hard stop against the inlet mixer at the determined location.

20. The method of claim 19, wherein the first component is a restrainer bracket of a jet pump assembly in the nuclear reactor.

* * * * *